US008260742B2

(12) United States Patent
Cognigni et al.

(10) Patent No.: US 8,260,742 B2
(45) Date of Patent: Sep. 4, 2012

(54) DATA SYNCHRONIZATION AND CONSISTENCY ACROSS DISTRIBUTED REPOSITORIES

(75) Inventors: Giorgio Cognigni, Rome (IT); Rosario Gangemi, Rome (IT); Massimo Villani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/418,187

(22) Filed: Apr. 3, 2009

(65) Prior Publication Data

US 2010/0257149 A1 Oct. 7, 2010

(51) Int. Cl.
G06F 7/00 (2006.01)
G06F 17/00 (2006.01)
G06F 17/30 (2006.01)

(52) U.S. Cl. .................. 707/620; 707/624; 707/797
(58) Field of Classification Search .............. None
See application file for complete search history.

(56) References Cited

U.S. PATENT DOCUMENTS

| | | | | |
|---|---|---|---|---|
| 5,644,763 A * | 7/1997 | Roy | ........... | 707/999.101 |
| 5,742,811 A * | 4/1998 | Agrawal et al. | ........ | 707/999.005 |
| 5,765,172 A | 6/1998 | Fox | | |
| 5,893,086 A * | 4/1999 | Schmuck et al. | ...... | 707/999.002 |
| 6,044,381 A | 3/2000 | Boothby et al. | | |
| 6,097,811 A * | 8/2000 | Micali | ........... | 713/186 |
| 6,470,329 B1 * | 10/2002 | Livschitz | ........... | 707/999.001 |
| 6,529,917 B1 | 3/2003 | Zoltan | | |
| 6,553,388 B1 | 4/2003 | Perks | | |
| 6,668,260 B2 | 12/2003 | Zoltan | | |
| 6,732,122 B2 | 5/2004 | Zoltan | | |
| 7,028,217 B2 | 4/2006 | Franckowiak et al. | | |
| 7,231,408 B2 | 6/2007 | Belcaid et al. | | |
| 7,464,103 B2 * | 12/2008 | Siu et al. | ........... | 707/999.002 |
| 7,680,833 B1 * | 3/2010 | Cole et al. | ........... | 707/999.201 |
| 7,680,998 B1 * | 3/2010 | Auchmoody et al. | ........ | 711/162 |
| 7,720,892 B1 * | 5/2010 | Healey et al. | ........... | 707/831 |
| 7,840,619 B2 * | 11/2010 | Horn | ........... | 707/829 |
| 7,974,221 B2 * | 7/2011 | Tamassia et al. | ........... | 707/770 |
| 2003/0056139 A1 * | 3/2003 | Murray et al. | ........... | 714/4 |
| 2007/0143280 A1 * | 6/2007 | Wang et al. | ........... | 707/5 |
| 2007/0282915 A1 * | 12/2007 | Vosshall et al. | ........... | 707/200 |
| 2008/0022057 A1 * | 1/2008 | Shah et al. | ........... | 711/162 |
| 2008/0109653 A1 * | 5/2008 | Yokohama | ........... | 713/156 |
| 2008/0136586 A1 * | 6/2008 | Backes et al. | ........... | 340/5.8 |
| 2009/0037491 A1 * | 2/2009 | Cachin et al. | ........... | 707/201 |

OTHER PUBLICATIONS

J. Cates. Robust and efficient data management for a distributed hash table. Jun. 2003, Master's thesis, MIT.*

(Continued)

*Primary Examiner* — Jacob F Bétit
*Assistant Examiner* — Kannan Shanmugasundaram
(74) *Attorney, Agent, or Firm* — DeLizio Gilliam, PLLC

(57) ABSTRACT

Data associated with the services in a service oriented architecture are stored in a primary repository and replicated across secondary repositories. Functionality can be implemented to efficiently synchronize data across the primary repository and the secondary repositories. Data synchronization can comprise calculating and comparing hash values of one or more nodes, based in part on concatenated hash values of child nodes and data that comprise the one or more nodes, of a tree structure representing data stored in the repositories.

17 Claims, 8 Drawing Sheets

OTHER PUBLICATIONS

Adams, Holt, "Best Practices for Web services: Part 9", http://www.ibm.com/developerworks/webservices/library/ws-best9/ (Obtained Jul. 21, 2008) Feb. 17, 2004.

Cormen, Thomas H. et al., "The height of a B-tree", *Introduction to Algorithms* 2nd Edition. Publisher: McGraw-Hill Higher Education 2001, 383-384.

Gunther, Harvey, "Performance Best Practices for Using WAS Web Services", http://websphere.sys-con.com/read/43436.htm (Obtained Jul. 21, 2008) Oct. 23, 2003.

Neubauer, Peter, "B-Trees: Balanced Tree Data Structures", http://www.bluerwhite.org/btree/ (Obtained Jul. 21, 2008). 1999.

Wikipedia, "B-tree", http://en.wikipedia.org/wiki/B-tree (Obtained Jul. 21, 2008).

* cited by examiner

DATA SYNCHRONIZATION AND CONSISTENCY ACROSS DISTRIBUTED REPOSITORIES

BACKGROUND

Embodiments of the inventive subject matter generally relate to the field of data storage, and more particularly, to data replication and consistency across distributed repositories.

A service-oriented architecture (SOA) is a form of distributed computing, where different functions are split up into individual services. The services are based on a service provider/service consumer paradigm. The services are loosely coupled to support inter-operability between different implementations of a primary repository and one or more secondary repositories. Data associated with the services are stored in the primary repository and replicated across the one or more secondary repositories.

BRIEF SUMMARY

Embodiments include a method comprising retrieving a first hash value of a first root node in a first tree structure associated with a secondary repository and a second hash value of a second root node in a second tree structure associated with a primary repository. It is determined that the first hash value and the second hash value are unequal. A third hash value of a first data unit associated with the first root node and a fourth hash value of a second data unit associated with the second root node are retrieved. The first data unit is stored in the secondary repository and the second data unit is stored in the primary repository. It is determined that the third hash value is not equal to the fourth hash value. The first data unit in the secondary repository is synchronized with the second data unit of the primary repository.

BRIEF DESCRIPTION OF THE DRAWINGS

The present embodiments may be better understood, and numerous objects, features, and advantages made apparent to those skilled in the art by referencing the accompanying drawings.

DETAILED DESCRIPTION

Figure 1:
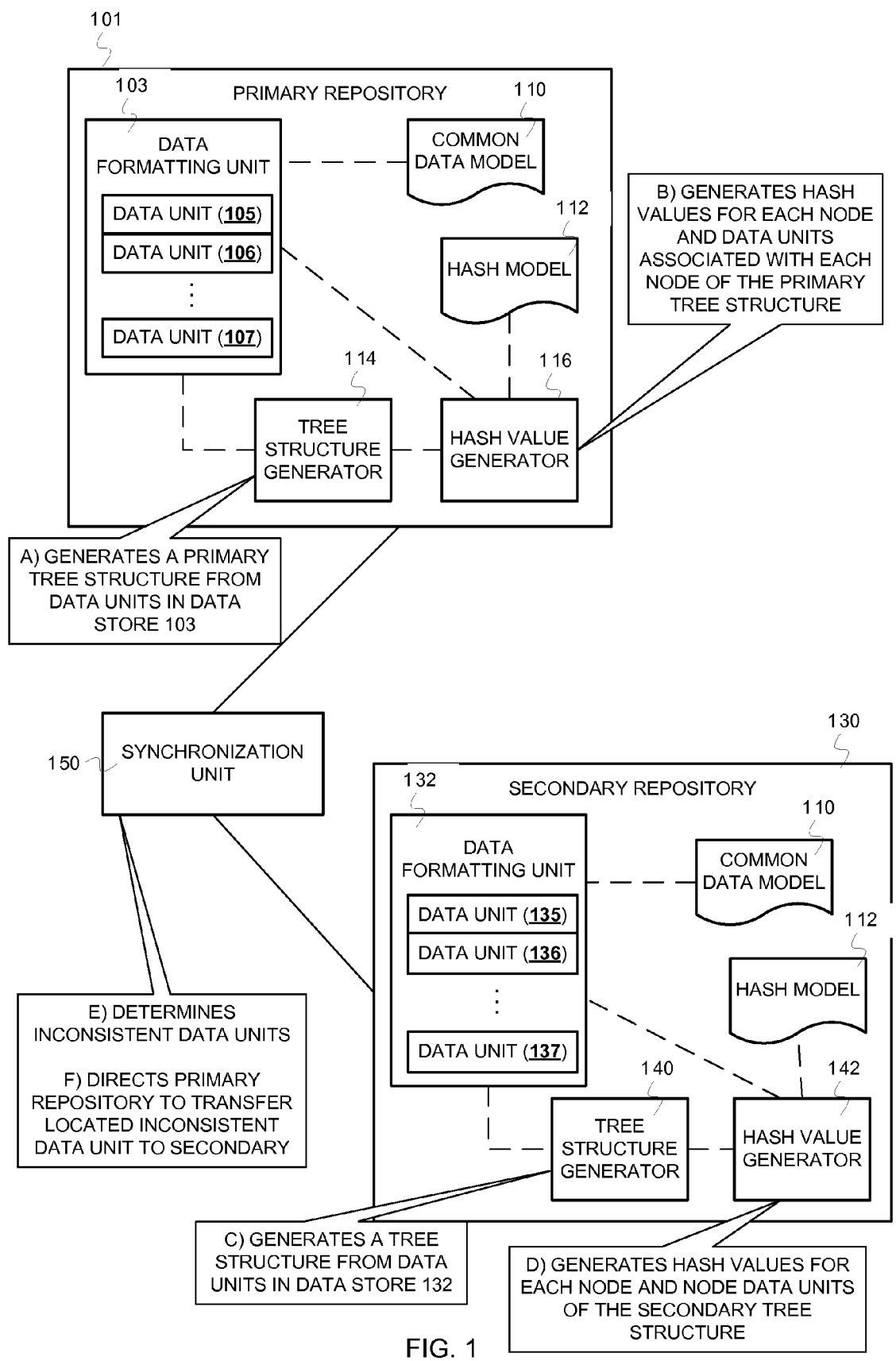
FIG. 1 is an example conceptual diagram for synchronizing data between a primary and a secondary repository.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Although examples refer to communications between the primary repository and secondary repositories in a service oriented architecture using web service technologies, any suitable architecture and techniques for inter-machine communication (e.g., representational state transfer based architecture, Jini®, CORBA®, etc.) can be used. In other instances, well-known instruction instances, protocols, structures, and techniques have not been shown in detail in order not to obfuscate the description.

Data synchronization techniques that reduce the computational complexity associated with synchronizing data between a primary repository and a secondary repository can improve efficiency and reduce the utilized processing power. Moreover, synchronization techniques that minimize the amount of interaction between the primary and the secondary repositories can lead to an efficient use of system resources. By decoupling the primary and the secondary repositories, each of the data repositories (i.e., the primary and the secondary repositories) can be managed independently. The use of a common data model across the data repositories allows different data repositories to be implemented with different database technologies. Interaction between the data repositories, while abstracting the data repositories' implementation, may be facilitated by web service based interactions. The primary and the secondary repositories can be configured to calculate hash values of one or more nodes of a tree structure representing data stored in the repositories. The hash values of the one or more nodes can be calculated based on concatenated hash values of child nodes and data that comprise the one or more nodes. The synchronization techniques can compare the hash values of the nodes and compare the hash values of data that comprise the nodes if there is a mismatch between the compared node hash values. Such a synchronization technique allows for a faster and more efficient determination of data inconsistencies by reducing the amount of data exchanged. Such a synchronization technique also allows for a faster synchronization of the determined data inconsistencies. This can reduce the number of data comparisons and reduce the number of data requests and data transfers, thus reducing computational complexity.

FIG. 1 is an example conceptual diagram for synchronizing data between a primary repository and a secondary repository. FIG. 1 comprises a primary repository 101 and a secondary repository 130. The primary repository 101 comprises a data formatting unit 103 coupled with a tree structure generator 114 and a hash value generator 116. The tree structure generator 114 is also coupled with the hash value generator 116. The data formatting unit 103 comprises one or more data units. In FIG. 1, the data formatting unit 103 comprises data unit 105, data unit 106, and data unit 107. The data units can comprise complex data (e.g., structures, arrays, records, etc.) or simple data (e.g., strings, integers, floating point values, characters, Boolean variables, etc). Each data unit may also be associated with a data unit identifier, a data unit name, etc. In some implementations, the data unit may be atomic (e.g., the smallest form of stored data). In other implementations, the data unit may contain data (e.g., simple or complex data) and other identifying information (e.g., data unit identifiers, relation maps to other data units, etc).

The data formatting unit 103 receives and formats the data units 105, 106, and 107 in accordance with a common data model 110. The data formatting unit 103 may implement functionality, e.g., in the form of code running on the data formatting unit 103, to receive and format the data units. The data formatting unit 103 may also comprise an internal storage unit to store the formatted data units. In some implementations, the data formatting unit 103 may receive and format the data units, connect to, and direct an external storage unit to store the data units. The data formatting unit 103 can organize, store, and access the data units based on the common data model 110.

The hash model 112 defines one or more permissible hash algorithms and input data to the hash algorithms. The hash value generator 116 retrieves the appropriate input data in accordance with the hash model 112 and calculates hash values of the data units. For example, the hash model 112 may indicate that hash values of the data units should be calculated using the data unit identifiers as input data. The hash value generator 112 can accordingly retrieve the data unit identifiers and generate hash values of the data units. The hash value generator 116 dynamically calculates the hash values based on a pre-defined hash algorithm. The hash algorithms may be stored as part of the hash value generator 116. In some implementations, the hash value generator 116 may access a repository of hash library files, select the appropriate hash library file, and generate the hash values of the data units. In another implementation, the hash value generator 116 may access a hash algorithm from an online database of hash algorithms.

The tree structure generator 114 generates a tree structure based on the data units in the data formatting unit 103. The tree structure generator 114 can retrieve the hash values calculated by the hash value generator 116 and generate a tree structure based on a defined tree algorithm. For example, the tree structure generator 114 generates a B-tree from the data units and hash values based on the data units. Operations performed on a B-tree (e.g., insert, read, update, delete, etc.) are computationally efficient in logarithmic time. In another example, the tree structure generator 114 generates a binary tree from the data units and hash values based on the data units. However, any suitable tree structure algorithm may be used to generate a tree structure from the data units. The tree structure is a hierarchical representation of linked nodes, wherein each of the nodes is associated with a set of one or more data units. The tree structure comprises one root node. The root node is determined using one or more data units, thus the root node is associated with the one or more data units. For instance, a node can indicate one or more data units explicitly, reference one or more data units, etc. The root node has one or more child nodes, which are at a lower hierarchical level. Likewise, each of the root node's child nodes can have child nodes of their own. A node with one or more child nodes is a parent node. Each of the nodes is determined from one or more data units and thus the nodes are associated with the data units from which they are determined. The number of data units contained in a node depends on the tree algorithm used to generate the tree structure. Calculating and comparing hash values of nodes can help quickly identify whether the data units associated with the nodes are synchronized. If there is an inequality in the hash values of the nodes that contain the data units, then the hash values of the data units associated with the node are compared, thus reducing the number of data transfers, comparisons, and computations.

After the tree structure generator 114 generates the tree structure, the hash value generator 116 calculates hash values of the nodes in the tree structure. To calculate the hash value of a node, which does not have any child nodes, the hash value generator 116 calculates a concatenation of hash values of the data units associated with the node. The hash value generator 116 then calculates a hash value of the concatenation. To calculate the hash value of a parent node, with multiple child nodes, the hash value generator 116 the hash values of the multiple child nodes and the hash values of data units associated with the parent node. The hash value generator 116 then determines a hash value of the concatenation. The primary and secondary repositories use a common hash algorithm to generate the hash values of the data units and the nodes. The primary and the secondary repositories also use a common tree generation algorithm and a common data formatting structure (e.g., defined in the common data model). However, the implementation of the common hash algorithm and the common tree generation algorithm may differ across the repositories.

The primary repository 101 and the secondary repository 130 are coupled with a synchronization unit 150. The secondary repository 130 comprises a data formatting unit 132 coupled with a tree structure generator 140, and a hash value generator 142. The tree structure generator 140 is also coupled to the hash value generator 142. The data formatting unit 132 comprises data unit 135, data unit 136, and data unit 137. When the secondary repository 130 is registered, the primary repository 101 transmits the common data model 110 and the hash model 112 to the secondary repository 130. The hash value generator 142 retrieves the appropriate input data in accordance with the hash model 112 and calculates hash values of the data units. The tree structure generator 140 generates a tree structure based on the data units in the data formatting unit 132 and hash values of the data units determined by the hash value generator 142. The hash value generator 142 then calculates the hash values of nodes in the tree structure. The tree structure generator 114 in the primary repository 101 and the tree structure generator 140 in the secondary repository 130 implement the same tree algorithm. Likewise, the hash value generator 116 in the primary repository 101 and the hash value generator 142 in the secondary repository 130 implement the same hash algorithm. This ensures uniformity between the tree structures and hash values generated by the primary repository 101 and the secondary repository 130

At stage A, the tree structure generator 114 generates a tree structure ("primary tree structure") from one or more of the data units in the data formatting unit 103 in the primary repository 101. At stage B, the hash value generator generates hash values for each data unit in the data formatting unit 103. The hash value generator 116 also accesses the generated primary tree structure and calculates a hash value for each node in the generated primary tree structure. At stage C, the tree structure generator 140 generates a tree structure ("secondary tree structure") from one or more of the data units in the data formatting unit 132 in the secondary repository. The primary and the secondary tree structures contain a root node and one or more child nodes. Each child node of the root node, in turn, can also have child nodes. Each of the nodes in the tree structures contains one or more data units. The tree structure is a hierarchical representation of the data units. The number of hierarchical levels, number of child nodes per node, and the number of data units contained in a node is variable and depends on the tree algorithm implemented by the tree structure generator. At stage D, the hash value generator 142 calculates hash values for each data unit in the data formatting unit 132 and each node in the secondary tree structure. The operations indicated in stages C and D need not be performed after the operations indicated by stages A and B. In some implementations, the operations indicated by stages C and D may be executed before stages A and B or in conjunction with stages A and B.

At stage E, the synchronization unit 150 determines one or more inconsistent data units. Operations for comparing hash values and locating inconsistent data units are further described in FIG. 2. The synchronization unit 150 first compares the hash values of the root nodes in the primary and the secondary tree structures. If the hash values of the root nodes are equal, the synchronization unit 150 stops traversing the tree structure. If the synchronization unit 150 determines that the hash values of the root nodes are unequal, the synchronization unit 150 then compares data units of the root nodes (e.g., hashes of individual data units) to determine if the data units of the root nodes are inconsistent. The synchronization unit 150 then successively compares hash values of data units associated with corresponding child nodes of the primary and secondary tree structures until one or more inconsistent data units are found. The synchronization unit 150 stops receiving and comparing hash values of data units and/or nodes when it finds a data unit with inconsistent hash values.

At stage F, the synchronization unit 150 directs the primary repository 101 to transfer the located inconsistent data unit(s) to replace the corresponding data unit(s) in the secondary repository 130. The synchronization unit 150 may transmit a data unit identifier corresponding to the inconsistent data unit. The primary repository 101 may receive the data unit identifier, locate the data unit with the received data unit identifier, and transmit the data unit to the secondary repository 130. The synchronization unit 150 may also transmit the data unit identifier to the secondary repository 130 and direct the secondary repository to update the data unit associated with the data unit identifier with the data unit transmitted by the primary repository 101. The primary repository 101 may connect to and communicate with the secondary repository 130 using a web services standard (e.g., using message transfer protocols such as simple object access protocol (SOAP), a web services description language (WSDL), and a suitable network (e.g., the Internet)). The web services standard also allows for interaction between the primary repository 101 and the secondary repository 130, while abstracting the implementation of the primary and secondary repositories. For example, in requesting the primary repository 101 to transfer a data unit to the secondary repository 130, the synchronization unit 150 could send an instruction "syncPrimaryToSecondary(data)" to the primary repository 101. The "data" parameter may be an array of data resulting from analysis of the primary and the secondary tree structures. The data array can comprise a secondary repository identification number, a data unit identification number, etc.

Although depicted as comprising one secondary repository 130, the network of FIG. 1 can comprise any suitable number of secondary repositories. The secondary repositories may be modeled as the secondary repository 130 of FIG. 1. The synchronization unit 150 may successively synchronize data units in each secondary repository with the corresponding data units in the primary repository. The synchronization unit 150 may also perform synchronization operations on all the secondary repositories simultaneously. Also, FIG. 1 depicts the synchronization unit 150 as a standalone unit (e.g., on a separate machine), comparing hash values received from the primary and secondary repositories. In some implementations, functionality for the synchronization unit 150 may be implemented on the primary repository 101 (e.g., in the form of a plug-in, a programmable chip, etc.). The primary repository 101 may be configured to receive hash values from the secondary repositories and compare the received hash values with corresponding locally calculated hash values (i.e., hash values calculated by the primary repository).

Figure 2:
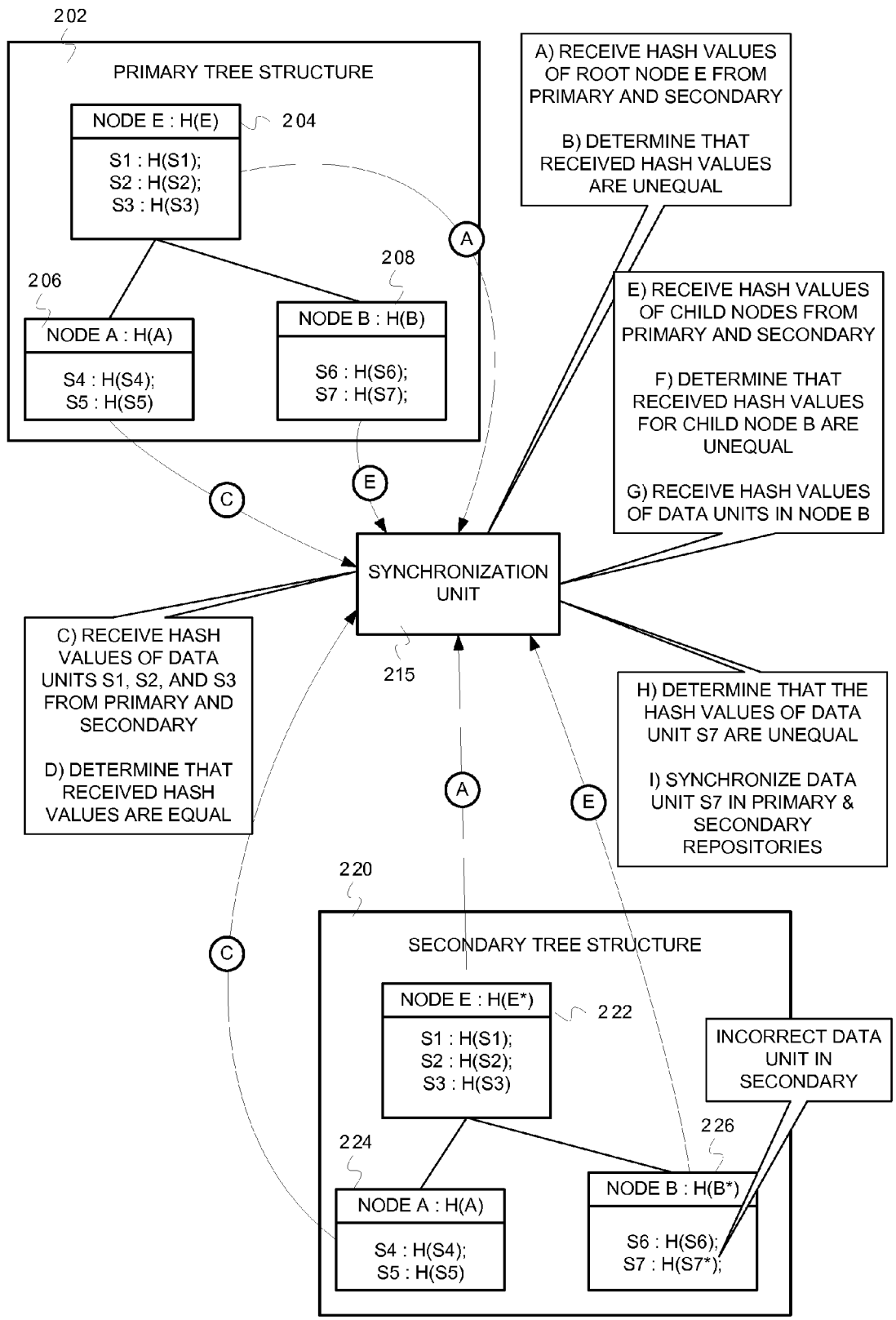
FIG. 2 is an example conceptual diagram illustrating tree structures associated with a primary and a secondary repository and operations for synchronizing data in the primary and the secondary repositories.

FIG. 2 is an example conceptual diagram illustrating tree structures associated with a primary and a secondary repository and operations for synchronizing data in the primary and the secondary repositories. FIG. 2 depicts a tree structure 202 ("primary tree structure") generated based on data units stored in the primary repository (e.g., the primary repository 101 of FIG. 1). The primary tree structure 202 comprises a root node E 204 with two child nodes—node A 206 and node B 208. Node E 204 has a hash value H(E) and comprises three data units S1, S2, and S3 with hash values H(S1), H(S2), and H(S3) respectively. In some implementations, the nodes in the tree structure may contain a copy of the data units associated with the nodes. In another implementation, the tree structure may contain a copy of data unit identifiers for each of the nodes in the tree structure. In other implementations, the tree structure may contain pointers to the data units, in a data store, associated with each of the nodes in the tree structure. Likewise, node A 206 has a hash value H(A) and contains data units S4 and S5 with hash values H(S4) and H(S5) respectively. Node B 208 has a hash value H(B) and contains data units S6 and S7 with hash values H(S6) and H(S7). FIG. 2 also depicts a tree structure 220 ("secondary tree structure") generated from data units stored in the secondary repository (e.g., the secondary repository 130 of FIG. 1). The secondary tree structure 220 comprises a root node E 222 with two child nodes—node A 224 and node B 226. Node E 222 has a hash value H(E*) and comprises three data units S1, S2, and S3 with hash values H(S1), H(S2), and H(S3) respectively. Node A 224 has a hash value H(A) and contains data units S4 and S5 with hash values H(S4) and H(S5) respectively. Node B 226 has a hash value H(B*) and contains data units S6 and S7 with hash values H(S6) and H(S7*). A synchronization unit 215 requests and receives hash values associated with the primary tree structure 202 and the secondary tree structure 220. The hash values of the nodes (i.e., H(E), H(A), H(B), H(E*), H(B*)) are calculated as a hash value of a concatenation of hash values of the contained data units and the hash values of the child nodes (in the case of the root node).

For example, the hash value of node A 206 is calculated as a hash value of a concatenation of the hash values of the data units associated with node A (i.e., hash values H(S4) and H(S5) for data units S4 and S5 respectively). Thus, the hash value of node A is calculated in accordance with Eq. 1, where ° is the concatenation operand.

$$H(A)=H(H(S4) \cdot H(S5))$$ Eq.1

Likewise, the hash value of root node E 204 is calculated as the hash value of a concatenation of the hash values of the data units S1, S2, and S3, and hash values of its child nodes 206 and 208 from the leftmost node to the rightmost node. This is illustrated in Eq. 2.

$$H(E)=H(H(S1) \cdot H(S2) \cdot H(S3) \cdot H(A) \cdot H(B))$$ Eq.2

At stage A, the synchronization unit 215 receives hash values of the root node 204 in the primary tree structure 202 and the root node 222 in the secondary tree structure 220. At stage B, the synchronization unit 215 compares the two received hash values (i.e., H(E) and H(E*)) and determines that the received hash values are unequal. The inequality of the hash values H(E) and H(E*) indicates that the data units in the secondary repository 130 are not synchronized with (i.e., not equal to) the data units in the primary repository 101.

At stage C, the synchronization unit 215 receives hash values of data units associated with the root node 204 in the primary tree structure 202 and the root node 222 in the secondary tree structure 220. The synchronization unit 215 receives hash values H(S1), H(S2), and H(S3) from both the primary tree structure 202 and the secondary tree structure 220. At stage D, the synchronization unit 215 compares the received hash values and determines that the data units associated with root node in the primary tree structure 202 and the secondary tree structure 220 are synchronized.

At stage E, the synchronization unit 215 receives hash values of child nodes—node A 206 and node B 208 of the primary tree structure 202 and node A 224 and node B 226 of the secondary tree structure 220. The synchronization unit 215 compares the received hash values for node A (i.e., H(A) received from both the primary and the secondary repositories), determines that the hash values are equal, and concludes that data units associated with node A in the primary and the secondary repositories are also synchronized.

At stage F, the synchronization unit 215 compares the received hash values for node B (i.e., H(B) received from the primary repository and H(B*) received from the secondary repository). The synchronization unit 215 determines that the hash values are unequal, and concludes that data units associated with node B in the primary and the secondary repositories are not synchronized. Therefore, at stage G, the synchronization unit 215 receives hash values of the data units associated with the node B in the primary tree structure 202 and the secondary tree structure 220. The synchronization unit 215 receives hash values H(S6) and H(S7) corresponding to data units S6 and S7 from the primary tree structure 202. The synchronization unit 215 also receives hash values H(S6) and H(S7*) corresponding to data units S6 and S7 from the secondary tree structure 220. At stage H, the synchronization unit 215 compares the received hash values and determines that data unit S7 is not synchronized. At stage I, the synchronization unit 215 directs the primary repository to transfer the data unit S7 to the secondary repository, thus ensuring that data in the primary repository is replicated in the secondary repository.

Although the synchronization unit 215 is depicted as receiving hash values from the primary tree structure 202 and the secondary tree structure 220, the synchronization unit 215 can receive the hash values from one or more of a tree structure generator (e.g., the tree structure generator 114 of FIG. 1) and a hash value generator (e.g., the hash value generator 116 of FIG. 1). In some implementations, the hash values of the data units may be stored as part of a data store on the primary and the secondary repositories.

Figure 3:
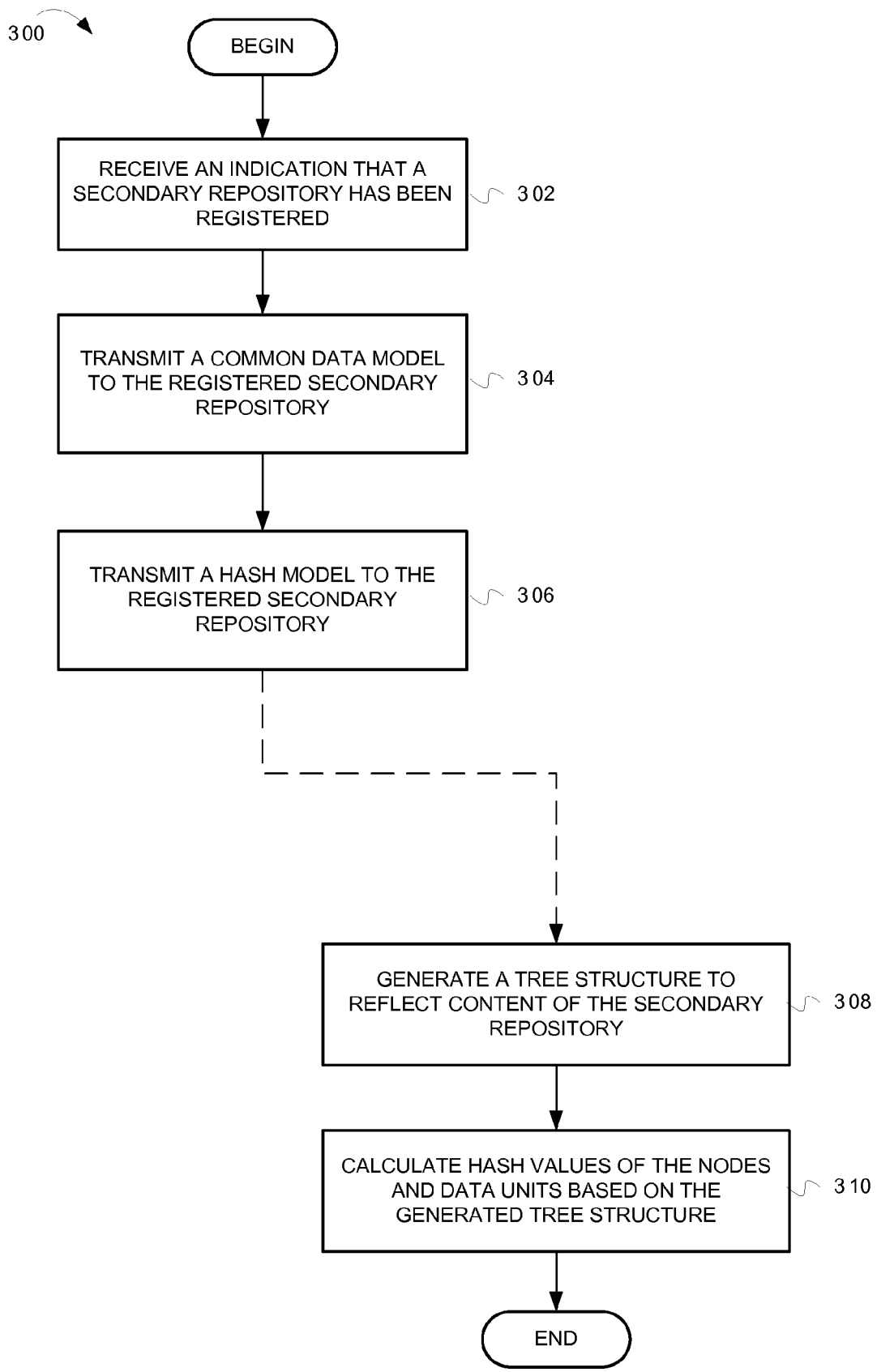
FIG. 3 is a flow diagram illustrating example operations for generating a tree structure and using hash values to synchronize data units.

FIG. 3 is a flow diagram illustrating example operations for generating a tree structure and using hash values to synchronize data units. The flow 300 begins at block 302.

At block 302, an indication that a secondary repository has been registered is received. The indication may be received by a primary repository after the secondary repository is configured and registered. The primary repository may also receive a secondary repository identification number, an address associated with the secondary repository, etc. The flow continues at block 304.

At block 304, a common data model is transmitted to the secondary repository. In some implementations, a system administrator may upload the common data model to the secondary repository. In other implementations, the primary repository may be configured to automatically transmit the common data model to the secondary repository. The common data model can be used to ensure a uniform data format across all data repositories (i.e., the primary repository and the secondary repositories). Typically, each of the data repositories may be implemented differently. For example, a first data repository may be implemented using Oracle® technologies, a second data repository may be implemented using a DB2® technology, and a third data repository may be implemented using a proprietary database technology. The common data model defines a data format that is independent of the repository implementation techniques. The common data model also precludes the need for writing and implementing data models in different languages for different repositories. Also, because each of the data repositories share and understand the common data model, data repositories need not format the data into a different format every time the data repositories exchange data. Data repositories can use guidelines outlined in the common data model to correctly organize, access, and store the data units. Data synchronization between the data repositories can be achieved if the data repositories format and store data in accordance with the common data model.

The XML code below is an example of a data model for a street address. The data model has a unique identifier based on an "id" attribute in the St-Address type (denoted by bold effects). As shown in the XML code below, the common data model defines content and format for each data unit stored in the repository. Each of the data repositories, irrespective of their implementation, can implement functionality to receive data units that conform to a format described by the common data model.

```
<element name="Address">
<complexType>
    <sequence>
        <element name="St-Address" type="dm:St-Address"/>
    </sequence>
</complexType>
<key name="pNumKey">
<selector xpath="dm:St-Address"/>
<field xpath="@id"/>
</key> </element>
<complexType name="St-Address">
    <sequence>
        <element name="name" type="string" minOccurs="0"/>
        <element name="city" type="string"/>
        <element name="country" type="dm:countryLoc"/>
    </sequence>
    <attribute name="id" type="string"/>
</complexType>
<simpleType name="countryLoc">
    <restriction base="string">
        <enumeration value="USA"/>
        <enumeration value="Italy"/>
    </restriction>
</simpleType>
```

Each data repository should adhere to the common data model and keep track of the data units and their associated identifiers. After the common data model is transmitted to the registered secondary repository, the flow continues at block 306.

At block 306, a hash model is transmitted to the registered secondary repository. The hash model defines permissible hash algorithms that may be used to generate hash values of the data units in the data repositories. The XML schema below is an example hash model that defines acceptable hash algorithms. The implementation of the hash algorithms (e.g., program code, hardwired logic, instructions, etc.) may be stored separately from the hash model.

```
<element name="HashFunction">
</element>
<simpleType name="function">
    <restriction base="string">
        <enumeration value="MD2">   </enumeration>
        <enumeration value="MD5">   </enumeration>
        <enumeration value="SHA-1">   </enumeration>
    </restriction>
</simpleType>
```

Based on the example XML schema, MD2, MD5, and SHA-1 hash algorithms are available to and may be implemented by the data repositories. For example, a primary repository and secondary repositories agree to use the MD2 algorithm for the hash function. In some implementations, the hash model (e.g., the XML schema) may indicate an association between a tree structure based on the data units and the agreed upon hash algorithm to be used by each of the data repositories. For instance, it may be agreed to use the MD5 algorithm for a hash function applied to a first type of data unit and the SHA-1 algorithm for a hash function applied to a second type of data unit. In another implementation, the primary repository may notify each of the secondary repositories (e.g., by transmitting a hash algorithm identifier) of the hash algorithm to be used. Additionally, the hash model may also define input data to be used calculate the hash value. For example, the hash model may indicate that a data unit identifier and a data unit name should be used as an input to generate a hash value for the data unit. The data unit "key name" and "id" described by bold effects in the common data model (see paragraph 0036) may be used as an input to calculate hash values for data units. The primary repository may also indicate, to the secondary repository, the hash algorithm to be used. The flow continues at block 308.

After the secondary repository receives the common data model (indicated at block 304) and the hash model (indicated at block 306), the secondary repository performs operations described by block 308 and block 310.

At block 308, a tree structure is generated to reflect the content of the data repository. Any suitable tree algorithm can be used to generate the tree structure. In one implementation, a B-tree algorithm may be used to generate a B-tree structure from the data units in the data repository. In another implementation, a binary tree can be generated from the data units in the data repository. All the data repositories should implement the same tree structure algorithm for uniformity and for comparison of the data units in the data repositories. The choice of the tree structure algorithm may depend on factors such as memory usage, number of computations, resultant height of the tree structure, etc. The flow continues at block 310.

At block 310, hash values of the nodes and data units associated with the nodes are calculated based on the generated tree structure. The hash values of the data units associated with the nodes are calculated with a hash function based on an agreed upon one of the pre-defined hash algorithms indicated in the hash model communicated at block 306 (e.g., MD2, MD5, etc). All the data repositories agree to implement the same hash algorithm for uniformity. In addition, hash values of the nodes are also calculated from the hash values of the data units. The hash value of a node that contains one or more data units is calculated as a hash value of a concatenation of hash values of the one or more data units associated with the node. To calculate the hash value of the parent node (i.e., a node with one or more child nodes), a concatenation of hash values of the one or more child nodes and the hash values of data units associated with the parent node is calculated. The hash value of the parent node is then determined by generating a hash value of the concatenation. Eq. 1 and Eq. 2 further illustrate the calculation of node and data unit hash values. The calculated hash values are stored (e.g., as part of the tree structure generated at block 308, in a repository linked to the tree structure of block 308, etc.) and are provided (e.g., to the primary repository or a synchronization unit) in response to a synchronization request. Also, the data units and/or identifiers of the data units associated with the nodes in the tree structure may be stored as part of the tree structure. In some implementations, the tree structure may contain references (e.g., pointer) to the data units associated with each node in the tree structure. The references may be used to locate, e.g., in a data store, the appropriate data units associated with a node and accordingly calculate hash values. From block 310, the flow ends.

Operations described by block 308 and 310 may be performed by a primary repository if a modification in content of the primary repository is detected or when a primary repository is created. If a modification in content of the data repository is detected, the tree structure and/or the hash values of the nodes and data units may be recalculated. Modification of the content of the data repository can comprise a deletion of a data unit in the data repository, an addition of a data unit, modification to a data unit, etc. In some implementations, it may first be determined whether the modification of the content influences the tree structure. For example, the addition of one or more data units may affect the tree structure. However, updating a data unit or replacing a data unit may not affect the tree structure and may only affect the hash values of one or more nodes in the tree structure. The tree structure and/or the hash values of the nodes and data units in the tree structure may be recalculated when a modification in the content of the data repository is detected. Modification of the data repository can also comprise a modification to a common data model and/or a hash model. The data repository recalculates the tree structure and hash values based on a new hash model and/or a common data model.

It should also be noted that all the data repositories should implement the same hash algorithm to calculate the hash values of the data units stored in the data repositories. Changes in the hash algorithm being used should be communicated to all the data repositories. For example, if the hash algorithm is changed from MD5 to SHA-1, the primary repository can notify the secondary repositories of the change to ensure each data repository calculates the hash values using the same hash algorithm. The primary repository may notify the secondary repositories about a change in the hash algorithm by transmitting a new hash model to the secondary repositories. The new hash model may comprise a new hash algorithm identifier, input values for the new hash algorithm, etc. Also, the common data model and the hash model should be transmitted to all the data repositories to indicate any changes made to the common data model and the hash model. It should also be noted that the XML schema described with reference to blocks 304 and 306 are examples. The common data model and the hash model may be implemented using any suitable programming language, markup language, etc.

Figure 4:
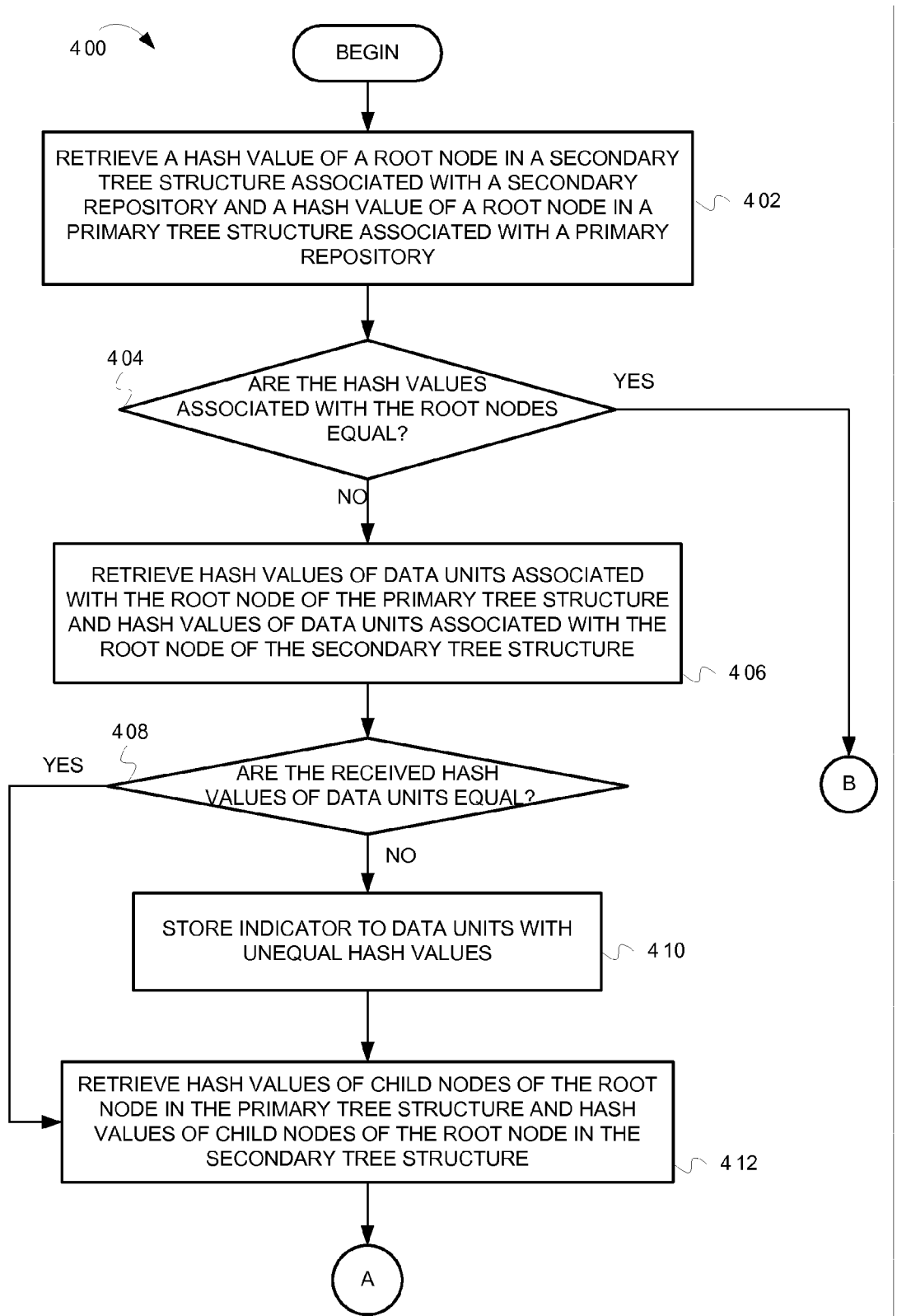
FIG. 4 is a flow diagram illustrating example operations for synchronizing data units between a primary and a secondary repository.
Figure 5:
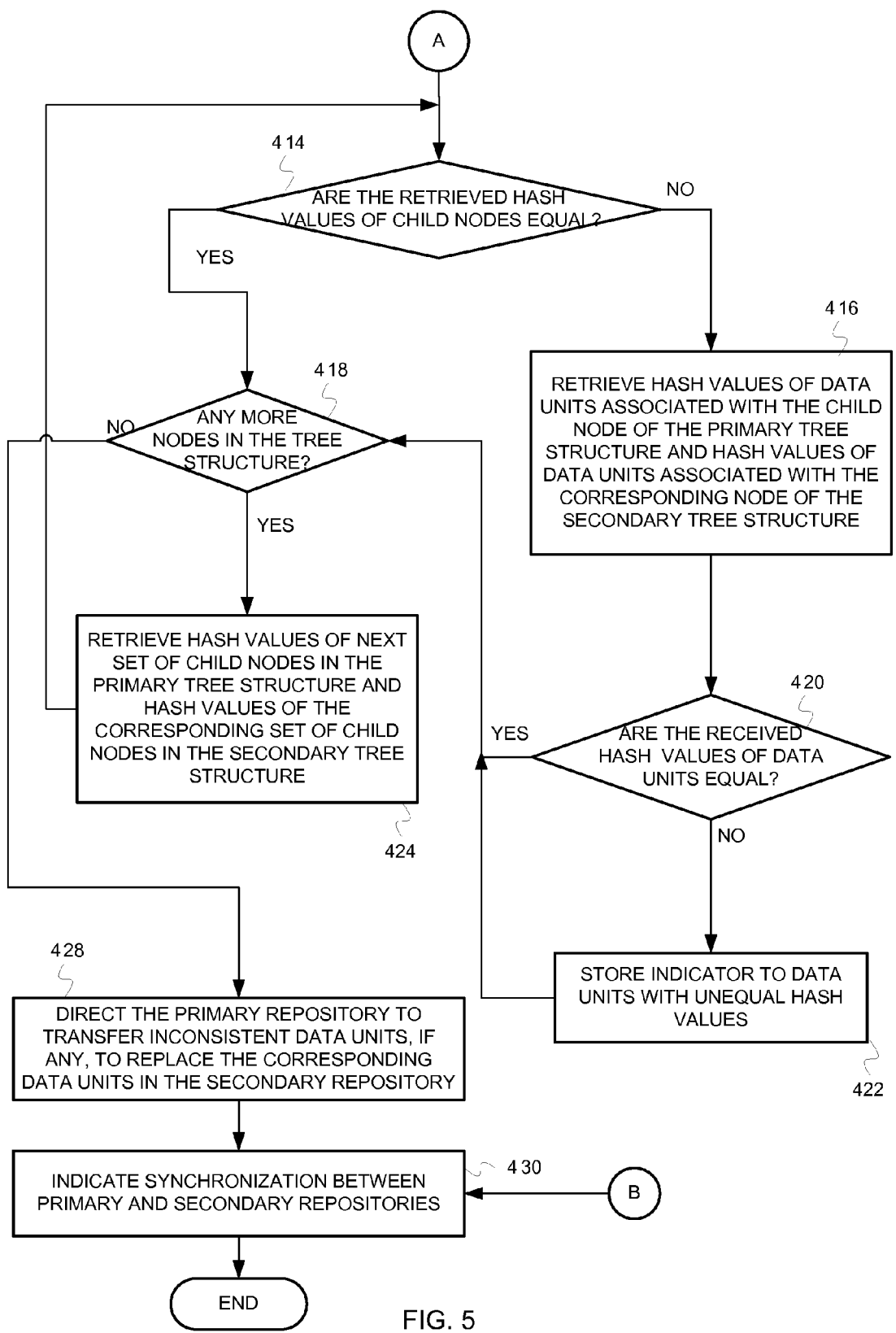
FIG. 5 is a flow diagram illustrating example operations for synchronizing data units between a primary and a secondary repository.

FIG. 4 and FIG. 5 depict a flow diagram illustrating example operations for synchronizing data units between a primary and a secondary repository. The flow 400 begins at block 402 in FIG. 4.

At block 402, a hash value associated with a root node in a tree structure of a secondary repository ("secondary tree structure") and a hash value associated with a root node in a tree structure of a primary repository ("primary tree structure") are retrieved. The hash values may be received, e.g., by a synchronization unit, in response to a request from the synchronization unit. The hash values may be requested at regular intervals in response to a trigger indicating that synchronization should be performed. The synchronization trigger may be manual or automatic. In some implementations, the synchronization unit may access the primary and the secondary repositories and retrieve the appropriate hash values. The flow continues at block 404.

At block 404, it is determined whether the retrieved hash values of the root nodes in the primary and the secondary tree structures are equal. The hash values can be compared by performing an element-by-element comparison (e.g., comparing individual characters, numbers, etc. that comprise the hash value). If it is determined that the hash values of the root nodes in the primary and the secondary tree structures are equal, the flow continues at block 430 in FIG. 5 (see connector B). Otherwise, the flow continues at block 406.

At block 406, hash values of data units associated with the root node of the primary tree structure and hash values of data units associated with the corresponding root node of the secondary tree structure are retrieved. The flow continues at block 408.

At block 408, it is determined whether the hash values of the data units retrieved at block 406 are equal. Matching of the received hash values indicates that the data units associated with the root node in the primary and the secondary tree structures are synchronized. However, because the hash values of the root nodes are unequal, this also indicates that data units associated with other nodes in the tree structures are not synchronized. If it is determined that the hash values of the data units associated with the root nodes of the primary and secondary tree structures are not equal, the flow continues at block 410. Otherwise, the flow continues at block 412.

At block 410, an indicator identifying the data units with unequal hash values is stored. For example, a data unit identification number and a secondary repository identification number may be stored to facilitate synchronization of data units in the primary and the secondary repositories. The flow continues at block 412.

At block 412, hash values of one or more child nodes of the root node in the primary tree structure and hash values of corresponding one or more child nodes of the root node in the secondary tree structure are retrieved. The flow continues at block 414 in FIG. 5 (see connector A).

At block 414, it is determined whether the retrieved hash values of the child nodes in the primary and secondary tree structures are equal. The hash values can be compared by comparing individual characters, numbers, etc. that comprise the hash value. If it is determined that the retrieved hash values are equal, the flow continues at block 418. Otherwise, the flow continues at block 416, where hash values of data units associated with the child nodes are retrieved from the primary and the secondary repositories and compared.

At block 416, hash values of data units associated with the child node of the primary tree structure and hash values of data units associated with the corresponding node of the secondary tree structure are retrieved. Before the hash values are retrieved, a node identifier associated with a node with inconsistent hash values may first be determined. The node identifier may be used to locate and retrieve, from the primary and secondary repositories, the hash values of the data units associated with the identified node. This can ensure that only data units associated with inconsistent nodes are retrieved. The flow continues at block 420.

At block 420, it is determined whether the retrieved hash values of the data units are equal. As mentioned earlier, the hash values may be compared by performing an element-by-element comparison of the retrieved hash values. If it is determined that the retrieved hash values are equal, the flow continues at block 418. Otherwise, the flow continues at block 422.

At block 422, an indicator identifying one or more data units with unequal hash values is stored. The data units may be identified by a data unit identifier and a secondary repository identifier. The flow continues at block 418.

At block 418, it is determined whether the tree structure contains a next set of nodes to be compared. As described earlier, the tree structures comprise a hierarchy of nodes, where each node (except leaf nodes) has one or more child nodes. The primary and the secondary tree structures are traversed—starting with the root node and moving towards the leaf nodes to locate nodes and data units with inconsistent hash values. If it is determined that the primary and the secondary tree structures contain a set of nodes, at a lower hierarchical level, to be compared, the flow continues at block 424. Otherwise, the flow continues at block 428.

At block 424, hash values of a next set of child nodes in the primary tree structure and hash values of the corresponding set of child nodes in the secondary tree structure are retrieved. The flow continues at block 414.

At block 428, the primary repository is directed to transfer the data units identified at block 410 to the secondary repository. The secondary repository replaces the inconsistent data units with the data units received from the primary repository. In some implementations, the primary repository may receive a list of data unit identifiers and secondary repository identifiers. The primary repository may use the data unit identifier to locate the data unit and transfer the located data unit to the secondary repository identified by the secondary repository identifier. The primary repository may transfer the data unit to the secondary repository using web services technologies. From block 428, the flow moves to block 430.

At block 430, it is indicated that the primary and the secondary repositories are synchronized. The flow 400 also moves from block 404 (in FIG. 4) to block 430 if it is determined that the hash values of the root nodes in the primary and secondary tree structures are equal. From block 430, the flow ends.

Figure 6:
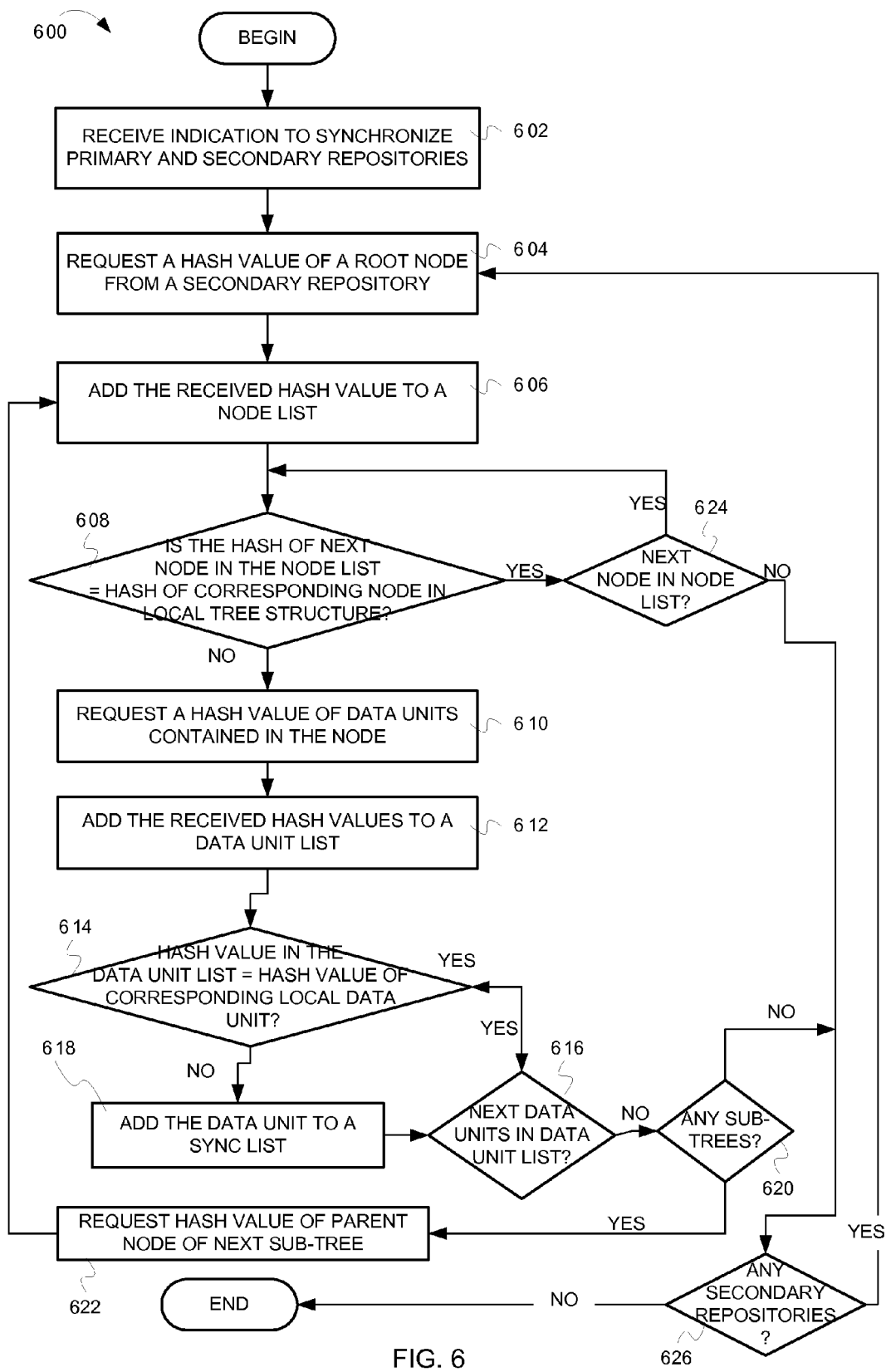
FIG. 6 is a flow diagram illustrating example operations for data synchronization between a primary and secondary repositories.

FIG. 6 is a flow diagram illustrating example operations for data synchronization between a primary and secondary repositories. Flow 600 of FIG. 6 describes an alternate embodiment where the primary repository receives hash values from a secondary repository and compares the received hash values to locally calculated hash values. The flow 600 begins at block 602.

At block 602, an indication to synchronize the primary and the secondary repositories is received. The indication to synchronize the data repositories may be generated in response to a system administrator requesting that synchronization of data repositories should be performed. The system may also be configured to synchronize the data repositories at regular intervals (e.g., first weekend of every month, etc). The indication to trigger synchronization of the data repositories may also be triggered by an unexpected event occurring in the system (e.g., system crashes, etc). The flow continues at block 604.

At block 604, a hash value of a root node in a tree structure associated with a first secondary repository ("first secondary tree structure") is requested. For example, the primary repository 101 of FIG. 1 may request the hash value of the root node in the first secondary tree structure. Communication between the primary repository and the secondary repository may be facilitated by the use of web services technologies. The flow continues at block 606.

At block 606, the hash value received from the first secondary tree structure is stored in a node list. The node list comprises a list of hash values of the root node, internal nodes, and leaf nodes of the secondary tree structure. The node list may also include one or more of a node identifier, secondary tree structure identifier, secondary repository identifier, etc. to identify the nodes, the associated tree structure, and the secondary repository respectively. The flow continues at block 608.

At block 608, it is determined whether the hash value of a next node in the node list is equal to the hash value of the corresponding node in a local tree structure. The local tree structure may be a tree structure generated based on data units in the primary repository. If it is determined that the hash values of the two nodes are equal, the flow continues at block 610. Otherwise, the flow continues at block 624.

At block 610, hash values of data units contained in the node are requested. Each node is associated with one or more data units. The number of data units associated with a node depends on the tree algorithm used to generate the tree structure. For example, in a binary tree each node may be associated with two data units. The hash values of the nodes are calculated based, at least in part, on the hash values of the data units associated with the nodes. Therefore, comparing hash values of the data units associated with the nodes can help determine an unsynchronized data unit (e.g., a data unit in the secondary repository with data different from the corresponding data unit in the primary repository). The flow continues at block 612.

At block 612, the received hash values of the data units contained in the node are stored in a data unit list. The data unit list comprises a list of data units associated with the root node and/or the child nodes, where the nodes have hash values different from hash values of the corresponding local nodes. In addition to storing the hash values of the data units, the data unit list may also include one or more of a data unit identifier, secondary tree structure identifier, secondary repository identifier, identifier of the associated node, etc. to identify the nodes, the tree structures, and secondary repository of the data unit. The flow continues at block 614.

At block 614, it is determined whether the hash value of a data unit in the data unit list is equal to the hash value of the corresponding local data unit. If it is determined that the hash values of the two data units under comparison are equal, the flow continues at block 616. Otherwise, the flow continues at block 618.

At block 618, the data unit is added to a sync list. A data unit identifier along with a secondary repository identifier may be stored in the sync list to enable synchronization of data in the primary and the secondary repositories. The information in the sync list may be transmitted to the primary repository. The primary repository may transmit the identified data units to the secondary repository. The flow continues at block 616.

At block 616, it is determined whether the data unit list comprises another data unit to be compared. In some implementations, the data unit list may be cleared after all the data unit hash values, associated with a node, have been compared with the corresponding local data unit hash values. The data unit may be removed from the data unit list after it has been compared with the corresponding data unit of the secondary repository. The data unit in the data unit list may also be marked (e.g., a flag bit corresponding to a data unit in the data unit list may be set) after comparison operations have been performed. If it is determined that there exist data unit hash values to be compared, the flow continues at block 614, where the hash value of the next data unit in the data unit list is compared to the hash value of the corresponding local data unit. Otherwise, the flow continues at block 620.

At block 620, it is determined whether the first secondary tree structure comprises one or more sub-trees. The sub-trees are portions of the first secondary tree structure and can comprise a hierarchy of nodes—each node being associated with one or more data units. Depending on the tree structure generated, the tree structure can have a varying number of nodes at each level of hierarchy, a varying number of data units associated with each node, etc. Checking hash values of sub-trees can be equivalent to checking hash values of child nodes at each level of hierarchy (as described in the previous Figures). If it is determined that the secondary tree structure comprises one or more sub-trees, the flow continues at block 622. Otherwise, the flow continues at block 626.

At block 622, a hash value of a parent node of a next sub-tree is requested. The flow continues at block 606, where the received hash value is added to the node list.

At block 624, it is determined whether the node list comprises another hash value of a node to be compared. The node may be removed from the node list after it has been compared with the corresponding node of the secondary repository. The node the node list may also be marked after comparison operations have been performed. In some implementations, the node list may be cleared after all the hash values of nodes in the first secondary tree structure have been compared with the corresponding local node hash values. If it is determined that there exist hash values of nodes to be compared, the flow continues at block 608, where the hash value of the next node in the node list is compared with the hash value of the corresponding node in the local tree structure. Otherwise, the flow continues at block 626.

At block 626, it is determined whether the system comprises secondary repositories, which are to be synchronized. The sequence of operations described above (i.e., comprising block 604 to 624) are performed to synchronize each secondary repository with the primary repository. If it is determined that there exist secondary repositories to be synchronized with the primary repository, the flow continues at block 604, where a hash value of a root node of a tree structure is requested from the next secondary repository. Otherwise, the flow ends. In some implementations, an indication that the data repositories are synchronized and details of the synchronization process may be provided to the system administrator and administrators of the secondary repositories.

It should be noted that the operations described in the flow diagrams (FIGS. 3-6) are examples meant to aid in understanding embodiments and should not be used to limit embodiments or limit scope of the claims. Embodiments may perform additional operations, fewer operations, operations in a different order, operations in parallel, and some operations differently. For example, in FIG. 4, operations to synchronize identified inconsistent data units (i.e., operations described by block 416) may be performed immediately after the inconsistent data unit is identified (i.e., after block 410). As another example, the operations described in FIG. 6 may be performed by each secondary repository. Each secondary repository may receive hash values from the primary repository and compare the locally calculated hash values with the received hash values. The secondary repository may request data from the primary repository if an inconsistency in hash values is detected, and accordingly update the data in the secondary repository. It should also be noted that in some implementations, it might be possible to update data in the primary repository based on modifications made to a secondary repository. For example, each data unit in the primary and the secondary repositories may be associated with a timestamp. If the hash values of the data units in the primary and the secondary repository are found to be unequal, the timestamps associated with the corresponding data units in the primary and the secondary repositories may be compared. Functionality may be implemented to direct the data repository with the most recent timestamp to transmit the data unit to the other data repository.

Figure 7:
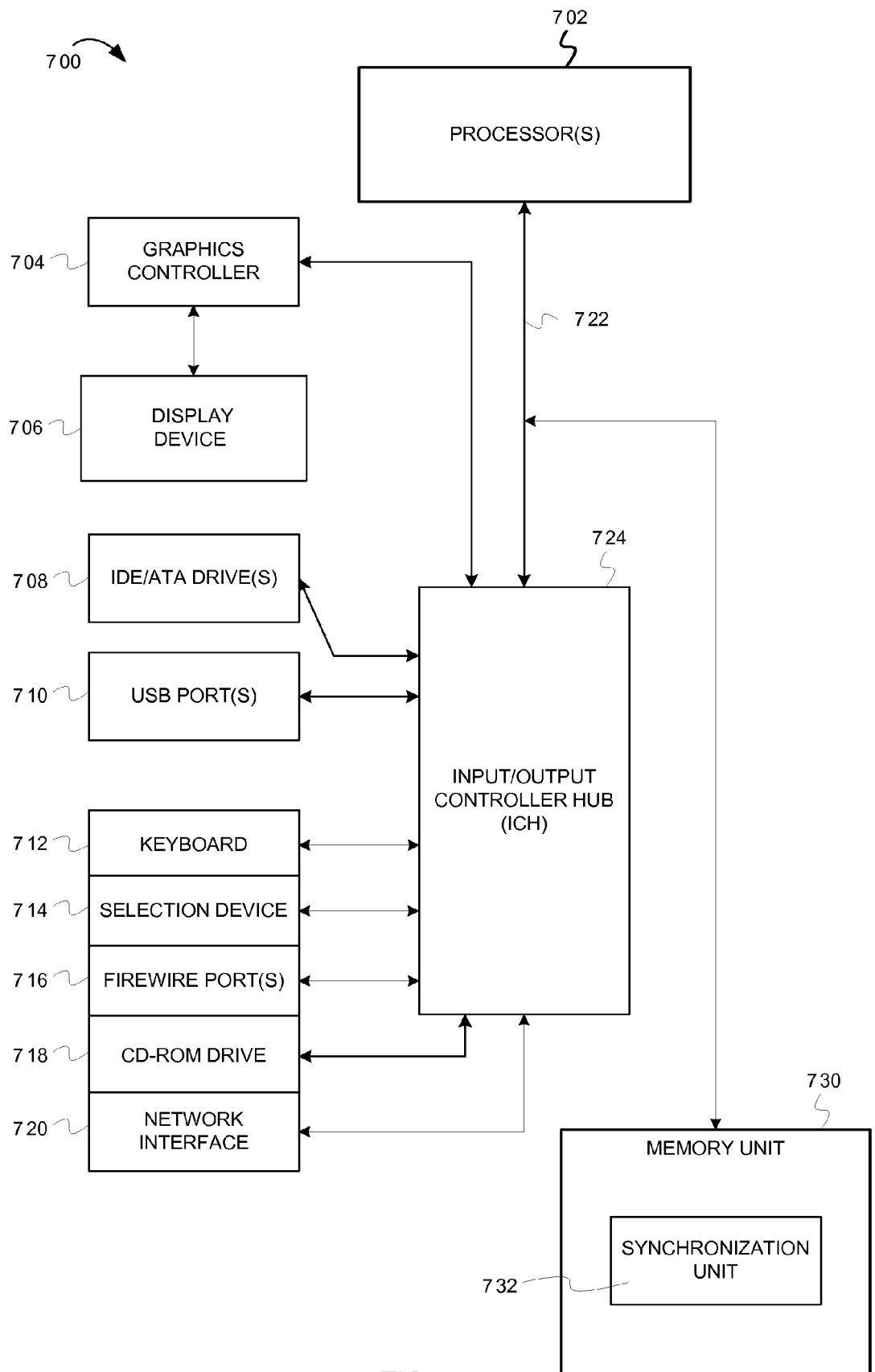
FIG. 7 is an example computer system configured to synchronize data units across data repositories.

FIG. 7 is an example computer system configured to synchronize one or more data units across data repositories. The computer system 700 includes a processor 702. The processor 702 is connected to an input/output controller hub 724 (ICH), also known as a south bridge, via a bus 722 (e.g., PCI, ISA, PCI-Express, HyperTransport, etc). A memory unit 730 interfaces with the processor 702 and the ICH 724. The main memory unit 730 can include any suitable random access memory (RAM), such as static RAM, dynamic RAM, synchronous dynamic RAM, extended data output RAM, etc.

The memory unit 730 comprises a synchronization unit 732. The synchronization unit 732 implements functionality to ensure that the data stored in a primary repository are replicated in all secondary repositories. The synchronization unit 732 requests and receives hash values associated with nodes and data units in a tree structure associated with the primary and the secondary repositories. The synchronization unit 732 first compares the hash values of the root nodes in the primary and the secondary tree structures. If the hash values of the root nodes are equal, the synchronization unit 732 stops traversing the tree structure and does not perform any further comparisons. If the synchronization unit 732 determines that the hash values of the root nodes are unequal, the synchronization unit 732 successively compares hash values of data units associated with the root node, child nodes, and data units associated with the child nodes in the primary and the secondary tree structures until one or more inconsistent data units are found. The synchronization unit 732 stops receiving and comparing hash values of data units and/or nodes when it finds an inconsistent data unit The synchronization unit 732 determines one or more unsynchronized data units and directs the primary repository to transmit the unsynchronized data unit to the secondary repository.

The ICH 724 connects and controls peripheral devices. In FIG. 7, the ICH 724 is connected to IDE/ATA drives 708 (used to connect external storage devices) and to universal serial bus (USB) ports 710. The ICH 724 may also be connected to a keyboard 712, a selection device 714, firewire ports 716 (for use with video equipment), CD-ROM drive 718, and a network interface 720. The ICH 724 can also be connected to a graphics controller 704. The graphics controller is connected to a display device (e.g., monitor). In some embodiments, the computer system 700 can include additional devices and/or more than one of each component shown in FIG. 7 (e.g., video cards, audio cards, peripheral devices, etc.). For example, in some instances, the computer system 700 may include multiple processors, multiple cores, multiple external CPU's. In other instances, components may be integrated or subdivided.

Figure 8:
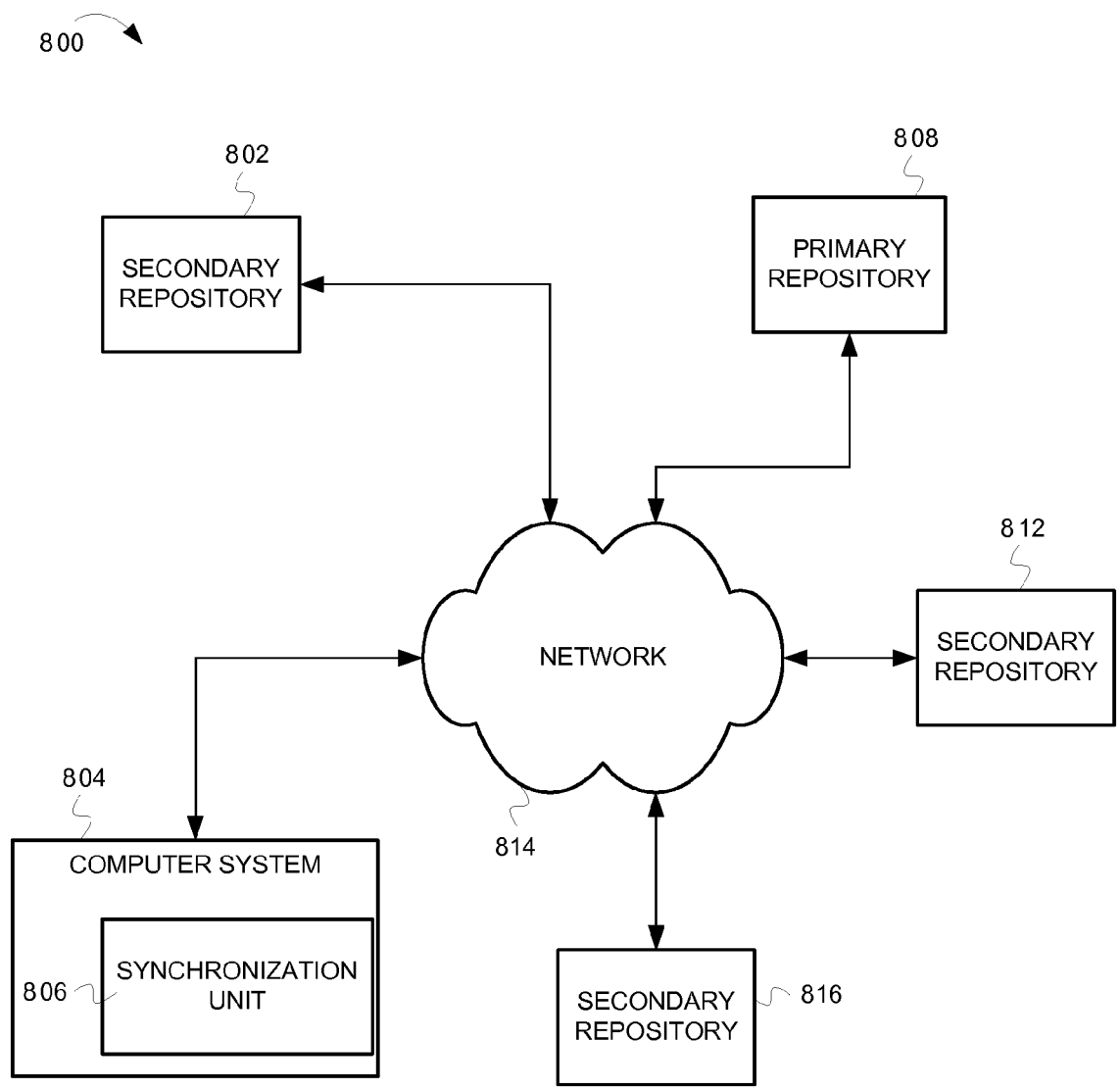
FIG. 8 is an example block diagram configured to synchronize one or more data units across data repositories.

FIG. 8 is an example block diagram configured to synchronize one or more data units across data repositories. The system 800 comprises a primary repository 808, a computer system 804, and secondary repositories 802, 812, and 816. The computer system 804 comprises a synchronization unit 806. The computer system 804 may be embodied as the computer system 700 of FIG. 7.

The data repositories (i.e., the primary repository 808 and the secondary repositories 802, 812, and 816) store one or more data units. Data units may be in the form of complex data (e.g., arrays, data structures, etc.) or simple data (e.g., strings, characters, number variables, etc). The data repositories generate a tree structure based on the data units and calculate hash values of the data units and nodes of the generated tree structure.

The synchronization unit 806 implements functionality to ensure that data units in the primary repository 808 are replicated in the secondary repositories 802, 812, and 816. The synchronization unit 806 requests hash values of the root node in the primary and the secondary tree structures, and compares the received hash values. The synchronization unit 806 stops traversing the tree structure if the synchronization unit 806 determines that the received root node hash values are equal. If the synchronization unit 806 determines the received root node hash values are unequal, the synchronization unit 806 requests hash values of data units associated with the root nodes. The synchronization unit 806 successively compares hash values of child nodes in the primary and secondary tree structures and hash values of data units associated with the child nodes and identifies one or more unsynchronized data units (i.e., data units with unequal hash values). The synchronization unit 806 directs the primary repository 808 to transmit data in the unsynchronized data units to the secondary repository. The synchronization unit 806 performs the above-described operations on each secondary repository until the data units are synchronized across all the data repositories.

The primary repository 808, the computer system 804, and the secondary repositories 802, 812, and 816 communicate via a network 814. The primary repository 808 may communicate with the secondary repositories 802, 812, and 816 (e.g., for data transfer) using web services technology designed for communication over a network 814 (e.g., the Internet) using message exchanging protocols such as (Simple Object Access Protocol (SOAP)). The web services standard allows for interaction between the primary repository 808 and the secondary repositories 802, 812, and 816 while abstracting the implementation of the primary and secondary repositories. In other implementations, the communication network 814 can include any technology suitable for passing communication between the repositories and the computer system 804 (e.g., Ethernet, 802.11n, SONET, etc). Moreover, the communication network 814 can be part of other networks, such as cellular telephone networks, public-switched telephone networks (PSTN), cable television networks, etc. Additionally, the primary repository 808, the secondary repositories 802, 812, and 816, and the synchronization unit 806 can be any suitable devices capable of executing software in accordance with the embodiments described herein. Also, although depicted as embodied on a distinct computer system, the synchronization unit 806 may be implemented as part of the primary repository. In some implementations, the synchronization unit 806 may also be implemented on each secondary repository. The synchronization unit 806 may be implemented as a chip, plug-in, code in memory, etc.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for data synchronization across distributed repositories as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims. For example, and as discussed above, although most of the discussion contained herein has focused upon communications between repositories in a service oriented architecture using web service technologies, this disclosure is not limited to these examples as any suitable architecture and techniques can be used for inter-machine communication (e.g., representational state transfer based architecture, Jini®, CORBA®, etc).

What is claimed is:

1. A method comprising:

retrieving a first hash value of a first root node in a first tree structure associated with a first secondary repository, wherein the first secondary repository comprises a first machine-readable storage medium encoded with the first tree structure, wherein the first root node is associated with a first plurality of data units and comprises a first plurality of hash values, wherein the first plurality of hash values were computed from the first plurality of data units, wherein the first hash value is computed based on the first plurality of hash values and a second plurality of hash values of child nodes of the first root node;

retrieving a second hash value of a second root node in a second tree structure associated with a primary repository, wherein the primary repository comprises a second machine-readable storage medium encoded with the second tree structure, wherein the second root node is associated with a second plurality of data units and comprises a third plurality of hash values computed from the second plurality of data units, wherein the second hash value is computed based on the third plurality of hash values and a fourth plurality of hash values of child nodes of the second root node;

comparing the first hash value and the second hash value;

determining that the first hash value is not equal to the second hash value;

comparing the first plurality of hash values against respective ones of the third plurality hash values;
for each hash value of the first plurality of hash values that does not match a respective one of the third plurality of hash values, modifying a data unit of the first plurality of data units, which was used to compute the hash value of the first plurality of hash values, in the first secondary repository to be synchronized with a data unit of the second plurality of data units, which was used to compute the respective one of the third plurality of hash values, of the primary repository;
retrieving a first of the second plurality of hash values of a first child node of the first root node in the first tree structure and a first of the fourth plurality of hash values of a second child node of the second root node in the second tree structure, wherein the first child node is associated with a third plurality of data units and the second plurality of hash values were computed from at least the third plurality of data units, and the second child node is associated with a fourth plurality of data units and the fourth plurality of hash values were computed from at least the forth plurality of data units;
comparing the first of the second plurality of hash values and the first of the fourth plurality of hash values;
determining whether the first of the second plurality of hash values and the first of the fourth plurality of hash values are not equal;
comparing a fifth plurality of hash values computed from the third plurality of data units with respective ones of a sixth plurality of hash values computed from the fourth plurality of data units to detect inconsistencies responsive to determining that the first of the second plurality of hash values and the first of the fourth plurality of hash values are not equal;
synchronizing the third plurality of data units to be consistent with the fourth plurality of data units in accordance with inconsistencies detected from said comparing the fifth plurality of hash values with respective ones of the sixth plurality of hash values; and
indicating that the primary repository and the first secondary repository are synchronized after determining others of the second plurality of hash values are equal to respective ones of the fourth plurality of hash values.

2. The method of claim 1, wherein for each hash value of the first plurality of hash values that does not match a respective one of the third plurality of hash values, the modifying the data unit of the first plurality of data units in the first secondary repository to be synchronized with the data unit of the second plurality of data units of the primary repository comprises:
for each hash value of the first plurality of hash values that does not match a respective one of the third plurality of hash values, directing the primary repository to transfer the data unit of the second plurality of data units of the primary repository to the first secondary repository.

3. The method of claim 1, wherein the tree structure comprises a B-tree.

4. The method of claim 1, wherein for each hash value of the first plurality of hash values that does not match a respective one of the third plurality of hash values, said modifying the data unit of the first plurality of data units in the first secondary repository to be synchronized with the data unit of the second plurality of data units of the primary repository comprises one of inserting the data unit of the second plurality of data units, deleting the data unit of the first plurality of data units, and modifying the data unit of the first plurality of data units.

5. The method of claim 1, wherein
the first hash value is a hash of a concatenation of the second plurality of hash values of the child nodes of the first root node and the first plurality of hash values of the first plurality of data units associated with the first root node, and
the second hash value is a hash of a concatenation of the fourth plurality of hash values of the child nodes of the second root node and the third plurality of hash values of the second plurality of data units associated with the second root node.

6. The method of claim 1 further comprising:
computing a hash of a concatenation of the second plurality of hash values of the child nodes of the first root node, modified hash values of the first plurality of hash values of the modified data units of the first plurality of data units, and other of the first plurality of hash values to generate a recomputed first hash value based on said for each hash value of the first plurality of hash values that does not match a respective one of the third plurality of hash values, modifying a data unit of the first plurality of data units in the first secondary repository to be synchronized with a data unit of the second plurality of data units of the primary repository.

7. The method of claim 1, further comprising:
receiving an indication that a second secondary repository is registered with the primary repository;
transmitting, to the second secondary repository, a common data model and a hash model.

8. The method of claim 7 further comprising the primary repository storing data in accordance with the common data model and the secondary repository storing data in accordance with the common data model.

9. The method of claim 7, further comprising the primary repository and the secondary repository calculating hash values in accordance with a hash algorithm indicated in the hash model.

10. The method of claim 9, further comprising the primary repository and the secondary repository calculating the hash values based on an input to the hash algorithm indicated in the hash model.

11. A computer program product comprising a non-transitory computer readable storage medium having computer readable code embodied therewith, said computer readable code configured to:
retrieve a first hash value of a first root node in a first tree structure associated with a first secondary repository, wherein the first root node is associated with a first plurality of data units and comprises a first plurality of hash values, wherein the first plurality of hash values were computed from the first plurality of data units, wherein the first hash value is computed based on the first plurality of hash values and a second plurality of hash values of child nodes of the first root node;
retrieve a second hash value of a second root node in a second tree structure associated with a primary repository, wherein the second root node is associated with a second plurality of data units and comprises a third plurality of hash values computed from the second plurality of data units, wherein the second hash value is computed based on the third plurality of hash values and a fourth plurality of hash values of child nodes of the second root node;
compare the first hash value and the second hash value;

determine that the first hash value is not equal to the second hash value;

compare the first plurality of hash values against respective ones of the third plurality hash values;

for each hash value of the first plurality of hash values that does not match a respective one of the third plurality of hash values, cause modification of a data unit of the first plurality of data units, which was used to compute the hash value of the first plurality of hash values, in the first secondary repository to be synchronized with a data unit of the second plurality of data units, which was used to compute the respective one of the third plurality of hash values, of the primary repository;

retrieve a first of the second plurality of hash values of a first child node of the first root node in the first tree structure and a first of the fourth plurality of hash values of a second child node of the second root node in the second tree structure, wherein the first child node is associated with a third plurality of data units and the second plurality of hash values were computed from at least the third plurality of data units, and the second child node is associated with a fourth plurality of data units and the fourth plurality of hash values were computed from at least the forth plurality of data units;

compare the first of the second plurality of hash values and the first of the fourth plurality of hash values;

determine whether the first of the second plurality of hash values and the first of the fourth plurality of hash values are not equal;

compare a fifth plurality of hash values computed from the third plurality of data units with respective ones of a sixth plurality of hash values computed from the fourth plurality of data units to detect inconsistencies responsive to the computer readable code determining that the first of the second plurality of hash values and the first of the fourth plurality of hash values are not equal;

cause synchronization of the third plurality of data units to be consistent with the fourth plurality of data units in accordance with inconsistencies detected from the computer readable code comparing the fifth plurality of hash values with respective ones of the sixth plurality of hash values; and indicate that the primary repository and the first secondary repository are synchronized after determining others of the second plurality of hash values are equal to respective ones of the fourth plurality of hash values.

12. The computer program product of claim 11, wherein for each hash value of the first plurality of hash values that does not match a respective one of the third plurality of hash values, the computer readable code configured to cause modification of the data unit of the first plurality of data units in the first secondary repository to be synchronized with the data unit of the second plurality of data units of the primary repository comprises the computer readable code being configured to, for each hash value of the first plurality of hash values that does not match a respective one of the third plurality of hash values, direct the primary repository to transfer the data unit of the second plurality of data units of the primary repository to the first secondary repository.

13. The computer program product of claim 11, wherein the computer readable code further comprises:

computer readable code configured to receive an indication that a secondary repository is registered with the data repository; and computer readable code configured to transmit, to the secondary data repository, a common data model and a hash model to which the data repository conforms.

14. The computer program product of claim 13, wherein the computer readable code further comprises computer readable code configured to cause the data repository and the secondary data repository to store data in accordance with the common data model.

15. The computer program product of claim 13, wherein the computer readable code further comprises computer readable code configured to cause the data repository and the secondary data repository to calculate hash values in accordance with a hash algorithm indicated in the hash model.

16. An apparatus comprising:
a processor unit;
a memory unit coupled to the processor unit; and
a synchronization unit configured to
retrieve a first hash value of a first root node in a first tree structure associated with a secondary repository, wherein the first root node is associated with a first plurality of data units and comprises a first plurality of hash values, wherein the first plurality of hash values were computed from the first plurality of data units, wherein the first hash value is computed based on the first plurality of hash values and a second plurality of hash values of child nodes of the first root node;

retrieve a second hash value of a second root node in a second tree structure associated with a primary repository, wherein the second root node is associated with a second plurality of data units and comprises a third plurality of hash values computed from the second plurality of data units, wherein the second hash value is computed based on the third plurality of hash values and a fourth plurality of hash values of child nodes of the second root node;

compare the first hash value and the second hash value;

determine that the first hash value is not equal to the second hash value;

compare the first plurality of hash values against respective ones of the third plurality hash values;

for each hash value of the first plurality of hash values that does not match a respective one of the third plurality of hash values, modify a data unit of the first plurality of data units, which was used to compute the hash value of the first plurality of hash values, in the first secondary repository to be synchronized with a data unit the first of the second plurality of data units, which was used to compute the respective one of the third plurality of hash values, of the primary repository;

retrieve a first of the second plurality of hash values of a first child node of the first root node in the first tree structure and a first of the fourth plurality of hash values of a second child node of the second root node in the second tree structure, wherein the first child node is associated with a third plurality of data units and the second plurality of hash values were computed from at least the third plurality of data units, and the second child node is associated with a fourth plurality of data units and the fourth plurality of hash values were computed from at least the forth plurality of data units;

compare the first of the second plurality of hash values and the first of the fourth plurality of hash values;

determine whether the first of the second plurality of hash values and the first of the fourth plurality of hash values are not equal;

compare a fifth plurality of hash values computed from the third plurality of data units with respective ones of a sixth plurality of hash values computed from the fourth plurality of data units to detect inconsistencies responsive to determining that the first of the second plurality of hash values and the first of the fourth plurality of hash values are not equal;

synchronize the third plurality of data units to be consistent with the fourth plurality of data units in accordance with inconsistencies detected from said comparing the fifth plurality of hash values with respective ones of the sixth plurality of hash values; and indicate that the primary repository and the first secondary repository are synchronized after determining others of the second plurality of hash values are equal to respective ones of the fourth plurality of hash values.

17. The apparatus of claim 16, wherein the synchronization unit comprises a machine-readable storage medium.

* * * * *